United States Patent [19]

Kuzusako

[11] Patent Number: 5,766,647
[45] Date of Patent: Jun. 16, 1998

[54] MOLDING TOOL FORMED BY LAMINATING MOLDING

[75] Inventor: Junichi Kuzusako, Saitama, Japan

[73] Assignee: Sony Corporation, Tokyo, Japan

[21] Appl. No.: 603,029

[22] Filed: Feb. 16, 1996

[30] Foreign Application Priority Data

Feb. 20, 1995 [JP] Japan .................. 7-053723

[51] Int. Cl.$^6$ .................. B29C 33/38
[52] U.S. Cl. .............. 425/84; 425/174.4; 425/85; 249/141
[58] Field of Search .............. 425/84, 85, 174.4; 249/134, 141

[56] References Cited

U.S. PATENT DOCUMENTS

| | | | |
|---|---|---|---|
| 3,722,467 | 3/1973 | Kaspar | 425/84 |
| 4,867,662 | 9/1989 | Shimahara et al. | 425/84 |
| 4,874,304 | 10/1989 | Ito et al. | 425/84 |
| 5,104,598 | 4/1992 | Dolle | 425/85 |
| 5,124,102 | 6/1992 | Serafini | 425/84 |
| 5,156,856 | 10/1992 | Iwasaki et al. | 425/84 |
| 5,296,335 | 3/1994 | Thomas et al. | 430/320 |
| 5,431,784 | 7/1995 | Miyamoto et al. | 425/84 |

FOREIGN PATENT DOCUMENTS

| | | |
|---|---|---|
| A-41 02 258 | 7/1992 | Germany. |
| 5-84719 | 4/1993 | Japan .................. 425/84 |
| 1724472 | 4/1992 | U.S.S.R. .................. 425/84 |
| A-2 035 602 | 6/1980 | United Kingdom. |
| A-93 16865 | 9/1993 | WIPO. |

Primary Examiner—James P. Mackey
Attorney, Agent, or Firm—Hill & Simpson

[57] ABSTRACT

A molding tool used for molding products of fibrous material is manufactured efficiently by employing a lamination molding method. A molding tool having a porous structure used for molding products of fibrous material such as pulp molding is manufactured by lamination molding method (a method for molding a three dimensional product by subjecting a material to be laminated to prescribed treatment, the method includes a photo-setting resin method). Material lacks or voids are formed on each layer of a laminating material, the layer is laminated one above another, thereby, many suction holes are formed on the molding tool as the material lacks.

14 Claims, 9 Drawing Sheets

F I G. 3
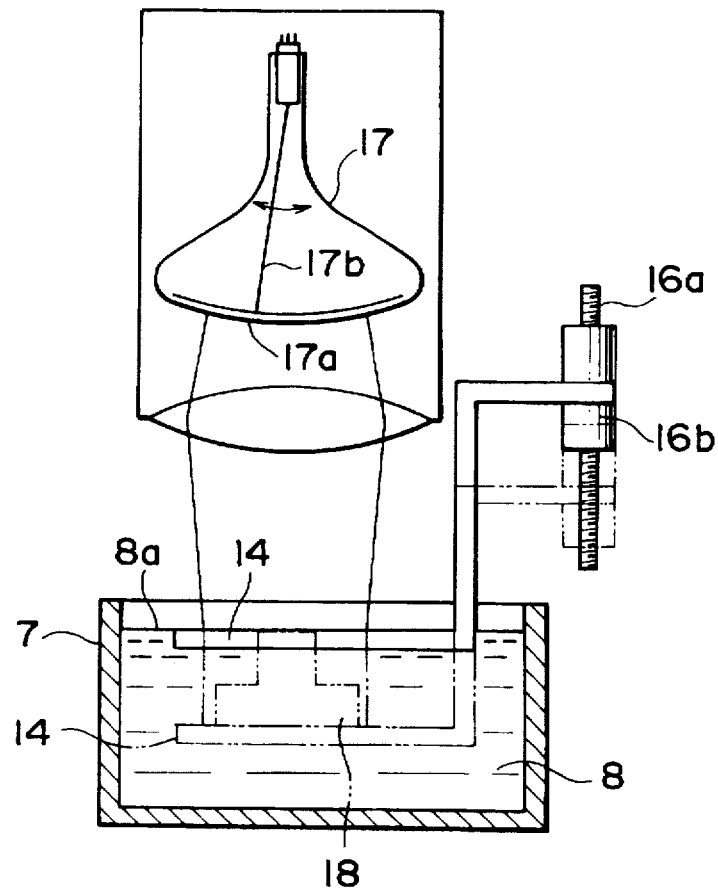
F I G. 4
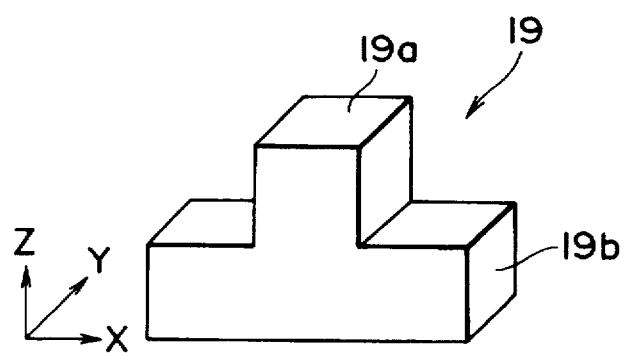

MOLDING TOOL FORMED BY LAMINATING MOLDING

BACKGROUND OF THE INVENTION

1. Field of the Invention

This invention relates to a molding tool and method for molding formed by lamination molding used for molding of a fibrous material, and this invention is to provide a new molding tool and method of molding which are devised to manufacture molding tools efficiently by utilizing lamination molding.

2. Description of Related Art

For example, a method which is referred to as pulp molding has been known as a molding method in which fibrous material is used, for example, this method has contributed to recycling and saving of resources and has been utilized to manufacture packaging which is not involved in environmental pollution because used paper is used fro manufacturing the packaging.

In the pulp molding method, pulp fibers agitated and suspended in water, subsequently to which thermosetting resin precondensate is added and suspended to attach to pulp fibers, then the suspension is premolded by vacuum suction through a molding tool of a desired shape, the premolded product is dried, then compression molded or heat-hardened to obtain finally a molded pulp product.

A molding tool which is referred to as paper making type molding tool has been popularly used as a molding tool for pulp molding, in an example shown in FIG. 11, a molding tool "a" is formed in a block-like hexahedron shape with a projection by casting. The molding tool "a" has a recess "b" which opens upward, the opening "c" is covered with a cover d, thus the molding tool a is structured so that the internal of the recess "b" is brought to a reduced pressure by suction using a vacuum aspirator "e".

The molding tool "a" is provided with many suction holes f, f, . . . for connecting between the recess "b" and the internal.

The molding tool "a" is provided with meshes g, g, . . . for covering the surface of the molding tool "a", and in the case that the molding tool "a" is complex in its shape, the molding tool is divided to a plurality of split molding tools a1, a2, . . . The opening size of the meshes g, g, . . . (usually smaller than 1 mm) are prescribed to be sufficiently smaller than that of the suction holes f, f, . . .

FIG. 12 shows the outline of molding by pulp molding.

A liquid tank h is filled with a solution "i" containing pulp fibers with an individual length of several mm, the molding tool which is covered with meshes g, g, . . . is dipped in the solution "i", then, the internal of the recess "b" of the molding tool "a" is sucked to vacuum, consequently pulp fibers are moves to the surface of the molding tool "a" namely meshes g, g, . . . After the premolding, the premolded product is subjected to a series of processes such as drying process, and a pulp molded product having a replica shape of the molding tool "a".

Such a conventional molding tool "a" requires some works for covering the surface of the molding tool with meshes g, g, . . . , it is difficult to improve the efficiency of the work and shorten the work time because of this troublesome works, this is a problem of the conventional molding tool.

In the case that the shape of a molding tool is complex or has a deep drawing shape, it is difficult to cover the molding tool with meshes, that is, various works such as works to fit meshes on the surface of the molding tool, to cover many split tools with meshes individually, some times to stretch a mesh for covering some portions of the molding tool, and to trim excessive portions of meshes are required, and these works require excellent skill for workers.

SUMMARY OF THE INVENTION

A molding tool formed by lamination molding in accordance with the present invention is a molding tool in which many suction holes are formed as material lacks of laminated layers using lamination molding for molding a three-dimensional shape product by subjecting material to be laminated to prescribed treatment, thus, the problem is solved by applying this molding tool.

In a molding method of molding tool formed by lamination molding in accordance with the present invention for solving the problem, material lacks or voids are formed on each laminate layer, and layers are laminated one above another, thus many suction holes are formed on a molding tool.

According to the present invention, many suction holes are formed easily by laminate-forming many suction holes on a molding tool as an alternative for suction holes and meshes formed on a conventional paper making type molding tool.

BRIEF DESCRIPTION OF DRAWINGS

FIG. 3 is diagram for illustrating schematically a method of plane irradiation.

FIG. 4 is a perspective view for illustrating an example of a basic shape of a molding tool and for illustrating preparation of structural data involving the molding tool in cooperation with FIG. 5 to FIG. 8.

FIGS. 7A and 7B are diagrams for illustrating the forming of holes on a plane perpendicular to Z-axis in a X-Y-Z coordinate system applied to the basic shape shown in FIG. 4, wherein FIG. 7A is a diagram for illustrating a lattice and FIG. 7B is a diagram for illustrating schematically the light scanning to form portion B in FIG. 7A.

BRIEF DESCRIPTION OF THE PREFERRED EMBODIMENTS

A molding tool formed by lamination molding and method of molding thereof in accordance with the present invention will be described referring to an embodiment shown in the figures.

The present invention provides a molding tool having many suction holes by utilizing lamination molding, thereby, the present invention provides a method for molding a molded product of fibrous material by using the molding tool.

The lamination molding herein refers to a method for forming a desired shape by applying prescribed treatments such as pressing and heat hardening to material to be laminated, and the lamination molding includes various molding methods such as powder melting molding, molten resin-spinning and laying molding, and sheet material lamination molding, that is, the lamination molding includes all methods which involve forming a three-dimensional product by laminating two-dimensional layers along a prescribed direction.

Figure 1:
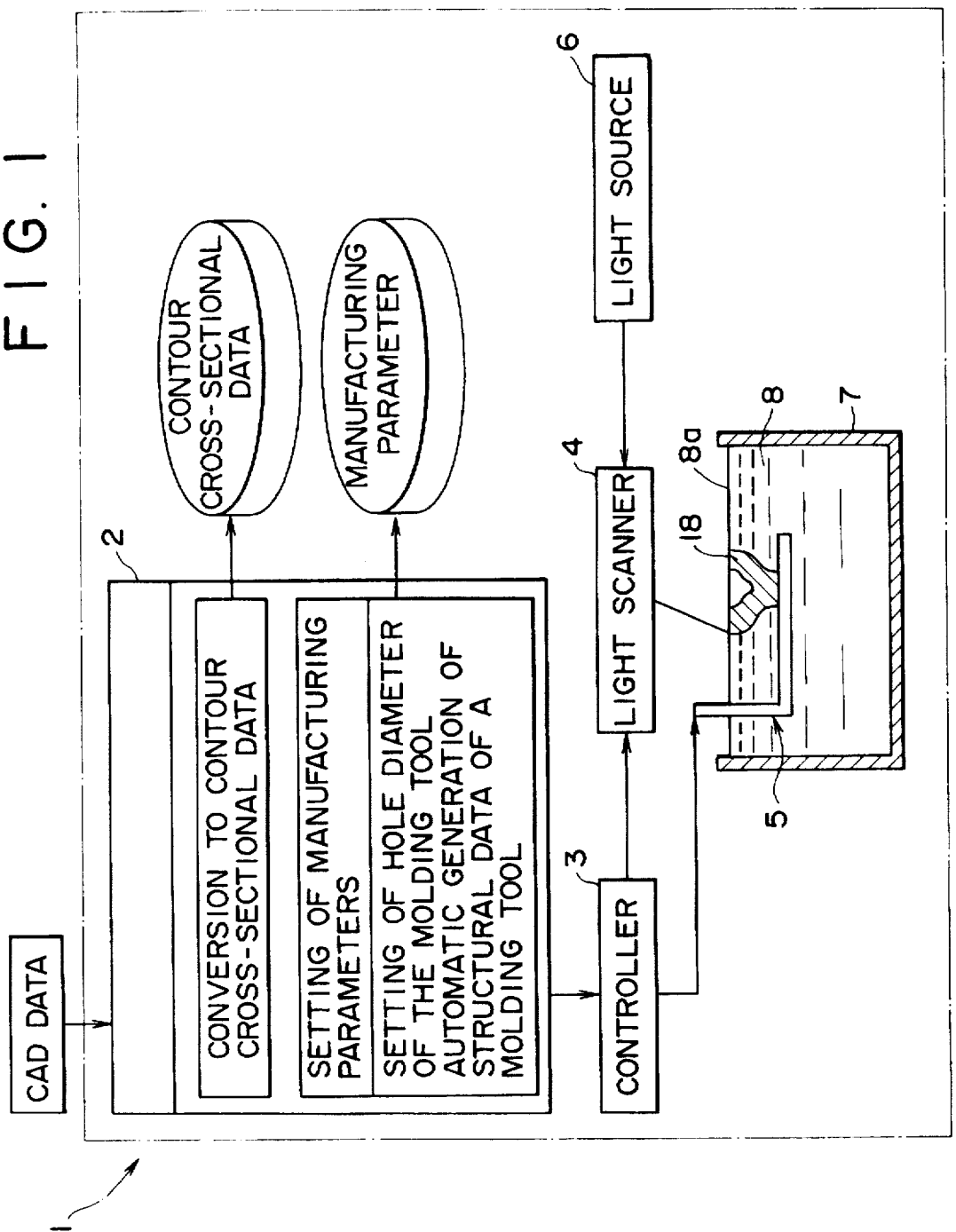
FIG. 1 is a diagram for illustrating schematically an embodiment of a molding equipment used in the present invention.

FIG. 1 is a schematic diagram of an embodiment of a photo- molding equipment for using photo-setting resin method (resin the hardness of which is changed by photo-irradiation, for example, the resin includes ultraviolet-setting resin).

Data of a shape model (called shape data hereinafter) which is an output from a three-dimensional CAD (abbreviation of computer aided design) are supplied to a computer 2.

The computer 2 serves as an operating table of the equipment 1, that is, serves as a directive center for setting various parameters and for processing data for manufacturing.

The computer 2 is necessary also for conversion processing from shape data to cross-sectional shape data and for compiling of data. In detail, a shape is cut along a prescribed lamination axis based on the shape data to obtain cross-sectional shape data (for example, in the case that the vertical direction is selected as the lamination axis, the data are data of contour cross-sections, this data is referred to "contour cross-sectional data" hereinafter), and the data are subjected to data processing by program processing.

For manufacturing a molding tool to be manufactured, various parameters including parameters involving diameter and pitch of many suction holes to be formed on a molding tool (the parameter is referred to "manufacturing parameter" hereinafter) are required and the computer 2 generates automatically data involving the structure of the molding tool based on the manufacturing parameters.

The computer 2 sends a control information corresponding to the contour cross-sectional data and manufacturing parameters to a controller 3.

The controller 3 controls a light scanner 4 and moving mechanism 5 based on an input control information from the computer 2.

The light scanner 4 is provided to irradiate the light on a desired position on the liquid surface 8a of photo-setting resin in a resin tank 7 by scanning the light from a light source 6.

Figure 2:
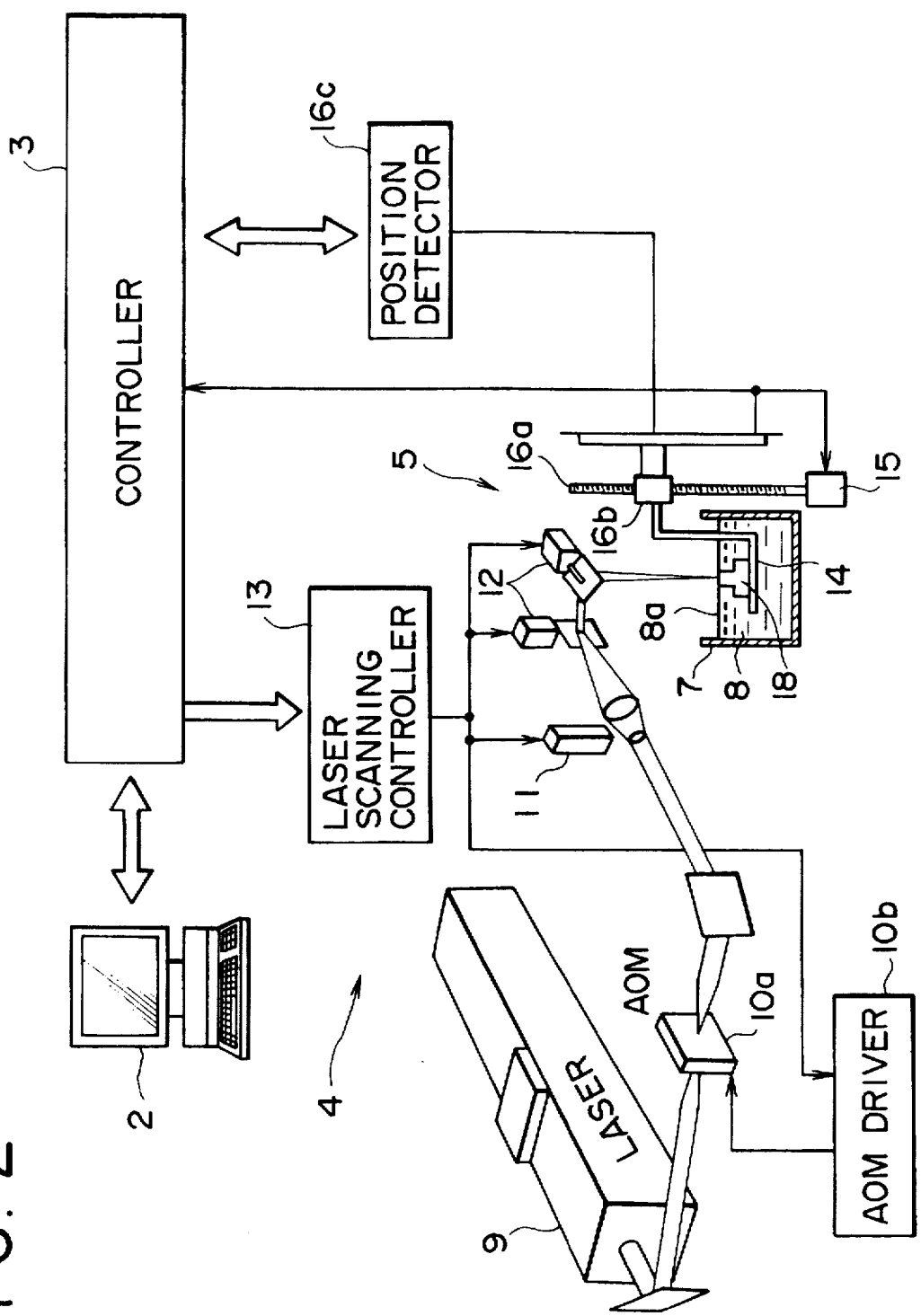
FIG. 2 is a diagram for illustrating schematically an example of a light scanner and moving mechanism shown in FIG. 1.

For example, in the case that a laser source is employed as the light source 6 and the laser is scanned as shown in FIG. 2, laser 9, an acausto-optic modulator (abbreviated to "AOM" hereinafter) 10a, AOM driver 10b involving the driving control thereof, focus controller 11, scanners 12, and laser scanning controller 13 for controlling these scanners 12 are provided. In detail, the laser beam passes through the AOM 10a, focus controller 11, and scanner 12 and scans on the liquid surface 8a of photo-setting resin 8. When, the laser scanning controller 13 controls modulation of AOM 10a through the AOM driver 11 and controls the focus controller 11 and rotation of a galvano-mirror of a scanner 12 responding to a command from the controller 3.

The moving mechanism 5 is provided for moving a stage 14 provided in the photo-setting resin tank 7 corresponding to lamination step of the photo-setting resin 8, for example, a mechanism using a ball screw is an example of an elevator mechanism for moving the stage 14 in vertical direction. As shown in the figure, the moving mechanism may be a mechanism that a feed screw 16a which is rotated by a stepping motor 15 extends in the vertical direction, to the feed screw a nut 16b is engaged spirally, and the stage 14 is moved in the vertical direction as the nut moves. A position information of the nut 16b is sent from a position detector 16c to the controller 3, the position of the stage 14 is controlled depending on a control signal sent from the controller 3 to the stepping motor 15. Any moving mechanism may be used as the moving mechanism 5 as long as the mechanism moves step-wise the stage 14 along the lamination direction to laminate resin layers along a prescribed direction which is hardened by light scanning on the stage 14.

In FIG. 2, the example of a structure in which the light source 6 and light scanner 4 are structured separately is shown because the laser 9 is used as the light source, however otherwise, for example as shown in FIG. 3, in an exposing system of planer irradiation, the light source 6 and light scanner 4 are incorporated in a one component by using a cathode ray tube (abbreviated to "CRT"). In detail, the panel plane 17a of the CRT 17 is positioned above the liquid surface of photo-setting resin 8, an electron beam 17b emitted from CRT 17 is scanned using deflecting coils, and energy of the electron beam 17b is converted to optical energy on a fluorescent layer, the light is irradiated on the liquid surface 8a of photo-setting resin directly or through a optical element.

Thus, a laminate molded product 18 is formed by repeating the hardening of photo-setting resin and moving of the stage 14 alternately.

A molding tool formed as a lamination molded product 18 has a structure having a cavity in the inside for favoring uniform suction and having many suction holes for passing from the external to the cavity, however, in some cases the cavity is not necessary, and a suction opening of the vacuum aspirator may be put tightly on a plane of the molding tool to suck.

Next, procedures for generating data involving the structure of the molding tool are described referring to FIG. 4 to FIG. 8. For easy understanding, this example involves the molding tool with a basic shape of block-like hexahedron having a projection.

(a1) Prescription of a basic shape

First, shown in FIG. 4, a basic shape 19 of block-like hexahedron having a projection is prepared for manufacturing a molding tool as design data. The direction of the projection of the block is assigned to Z-axis for accommodating the basic shape 19 to an orthogonal coordinate system, and for assigning X-axis and Y-axis perpendicular to Z-axis, the longitudinal direction of the base 19b of the block 19a of the basic shape 19 is assigned to X-axis.

(a2) Preparation of contour cross-sectional data

Figure 5:
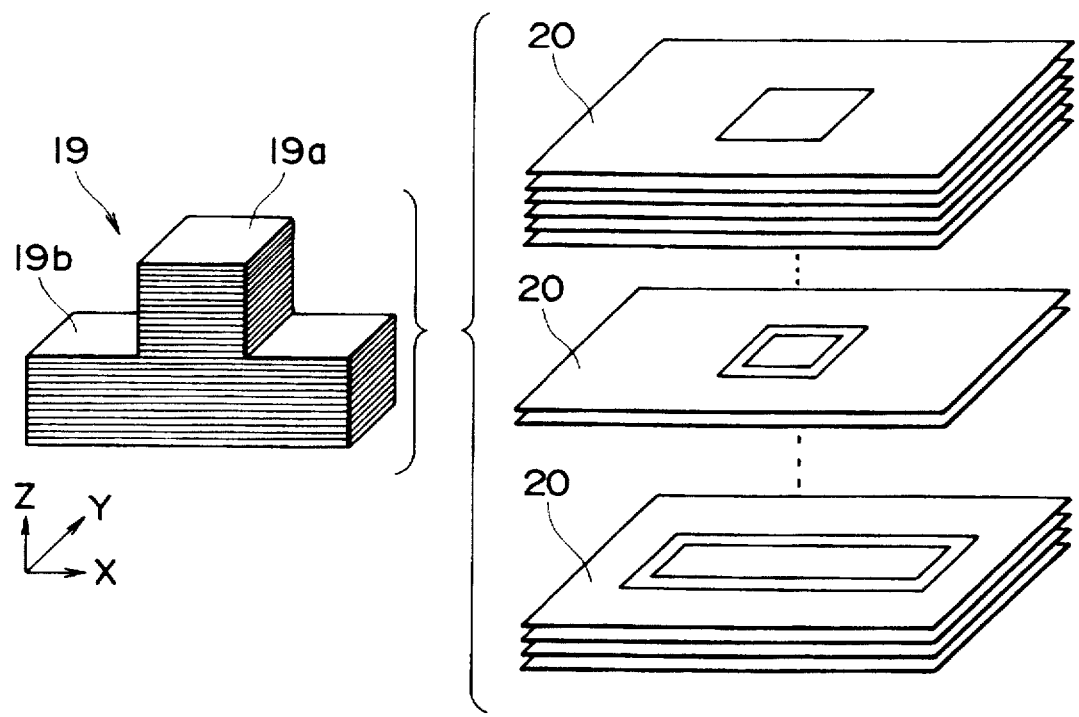
FIG. 5 is a perspective view for illustrating cross-sectional views at planes of a contour interval of the basic shape shown in FIG. 4.

Next, as shown in FIG. 5, the basic shape 19 is sliced in planes perpendicular to Z-axis direction for slicing processing. In detail, the basic shape 19 is cut along many planes 20, 20, . . . perpendicular to Z-axis and provided with a certain interval along Z-axis to prepare contour cross-sectional data for each plane.

(a3) Preparation of molding tool structural data

Figure 6:
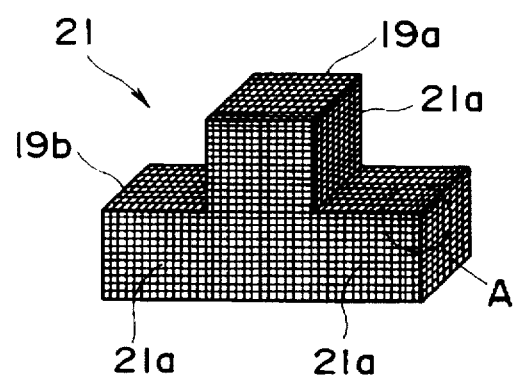
FIG. 6 is a perspective view for illustrating a molding tool on which many suction holes are formed.

FIG. 6 shows a molding tool 21 obtained by forming many suction holes 21a, 21a, . . . extending to X, Y, and Z-directions on the basic shape 19. These suction holes 21a, 21a, . . . are necessary to deposit fibrous material.

Figure 7A:
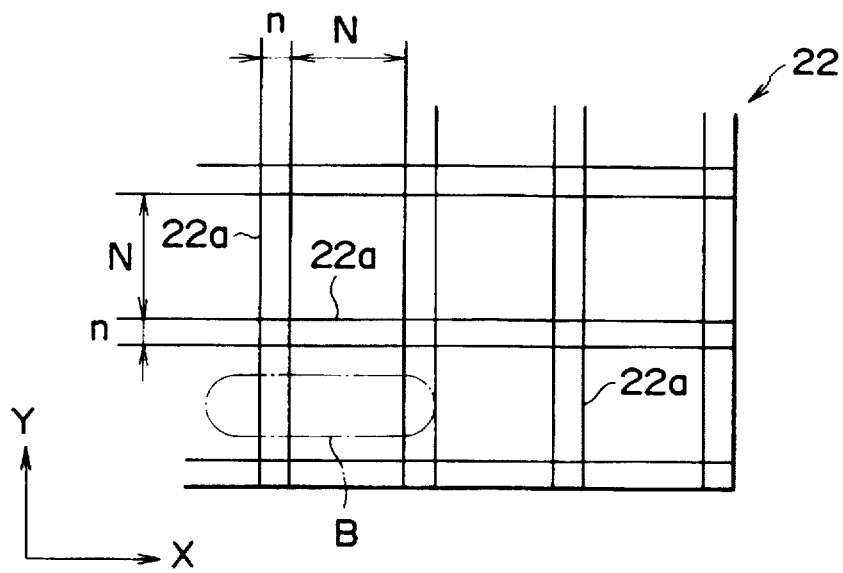
Figure 7B:
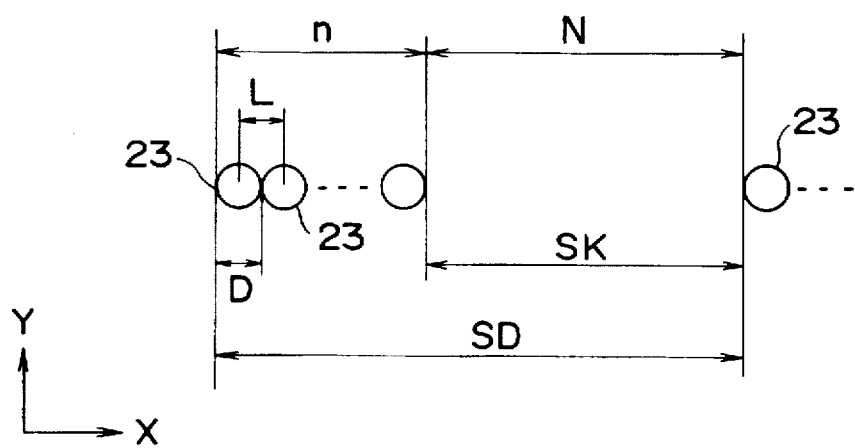
Figure 8:
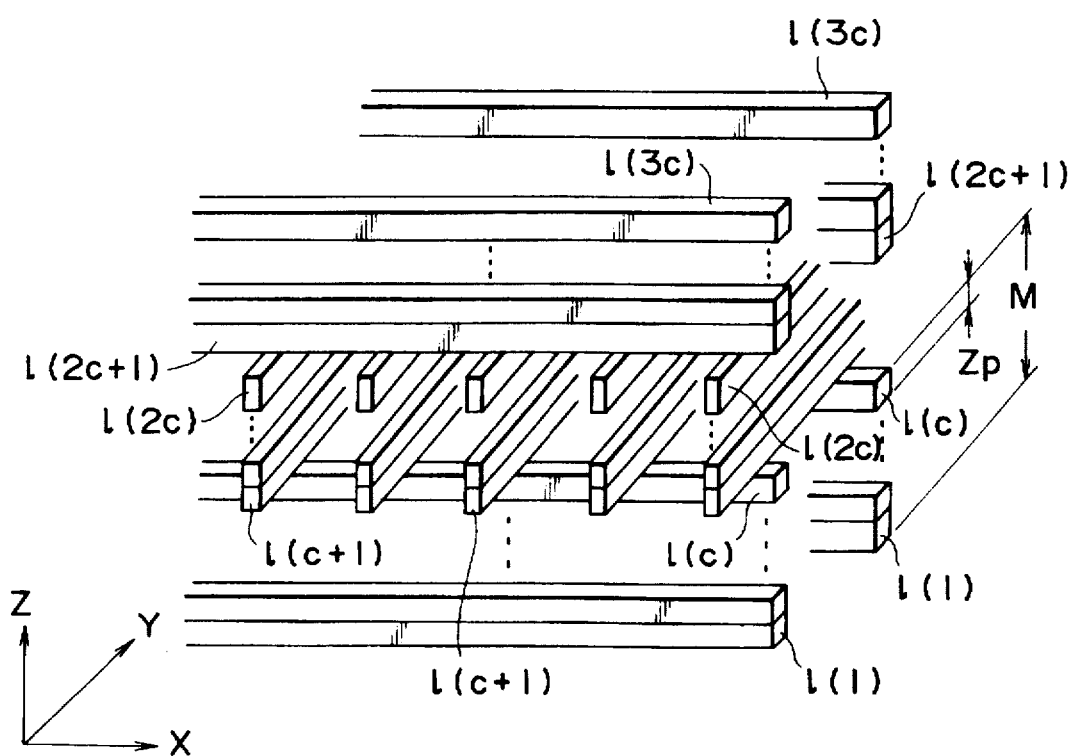
FIG. 8 is a perspective view for illustrating the forming of holes on a plane perpendicular to X-axis or Y-axis in the X-Y-Z coordinate system applied to the basic shape shown in FIG. 4.

FIGS. 7A and 7B and FIG. 8 are diagrams for illustrating the forming of suction holes 21a, 21a, . . . at a portion A marked with a circle shown in FIG. 6. FIGS. 7A and 7B illustrate the forming of holes on the plane parallel to an X-Y plane and FIG. 8 illustrates the forming of holes parallel to Z-X plane or Z-Y plane.

FIG. 7A illustrates net-like lattice 22 constituted with straight lines extending to vertical direction and horizontal direction viewing from Z-direction, "N" represents hole diameter and "n" represents a width of a lattice. In detail, lattice skeletons 22a, 22a, . . . with a width of "n" are portions hardened by light scanning of photo-setting resin 8, in this example, square holes with a side length of "N" are arranged along to X-direction and Y-direction, and a wall with a width of "n" partitions adjacent holes.

FIG. 7B illustrates schematically the forming of the lattice at the portion "B" marked with an ellipse shown in FIG. 7A.

Circles 23 represent a laser spot respectively, a diameter "D" represents the spot diameter. A lattice skeleton width "n" is determined based on the number of circles 23, 23, . . . arranged side by side and the overlapping of these circles. For example, in the case that "L" represents the scanning interval of the laser spot and a distance between centers of adjacent circles is equal for all circles, the lattice skeleton width "n" is equal to a sum of "D" and an integral multiple of "n". Especially as shown in the figure, in the case that circles 23, 23, . . . is arranged in a raw with contact side by side, then L=D, therefore, the number of beam spots required for obtaining a lattice skeleton width "n", namely the number of scans along X-direction per unit lattice, is equal to n/D.

"SK" in the figure represents a skip width, in this range the scanning of laser along X-direction is required to interrupt for forming holes. Therefore, the skip width "SK" is equal to the hole diameter "N".

"SD" represents a skip interval, and equal to a sum of the lattice width "n" and the hole diameter "N". In other wards, the skip interval "SD" is an interval from starting of light scanning on a range of a lattice width "n" to restarting of light scanning on the next range with interpolation of a skip width "SK". For example, in the case that length of pulp fibers is 2 to 3 mm for pulp molding, the skip interval may be prescribed to a value less than the pulp fiber length (for example 1 mm).

As described herein above, in the hole forming for the plane perpendicular to X-Y plane, values of various parameters can be determined based on the hole diameter "N", lattice skeleton width "n", and laser spot diameter "D", thus square holes extending to Z-direction are formed by laminating lattices 22.

FIG. 8 shows the forming of holes in a plane perpendicular to X-axis or Y-axis, [l(1) to l(c)] represents resin skeletons formed by light scanning in X-direction, [l(c+1) to l(2c)] represents resin skeletons laminated one above another on l(c) by light scanning in Y-direction, and [l(2c+1) to l(3c)] represents resin skeletons laminated one above another on l(2c) by light scanning in X-direction. In the above description, suffix number in parentheses is prescribed to increase along in the positive direction of Z-axis, therefore, a skeleton having larger suffix number is laid on the previous skeleton having smaller suffix number one above another.

Thickness "Zp" of l(1) to l(3c) in Z-direction represents a lamination pitch, hole diameter "M" in Z-direction is equal to a integral multiple of "Zp" for a constant value of the lamination pitch "Zp". For example, the hole diameter "M" between l(1) and l(c) is equal to the product of the lamination pitch "Zp" and the number of laminate from l(1) to l(c), namely "c". This is true for other hole diameters such as a hole diameter from l(c) to l(2c) or from (2c+1) to (3c). Hole interval formed in Z-direction (namely interval between l(c) and l(2c+1)) is determined based on the number of laminates from l(c+1) to l(2c) extending in Y-direction.

As described herein above, the hole diameter "M" in a plane parallel to Z-Y plane and Z-X plane is determined based on the lamination pitch "Zp" and the number of laminates "c", thereby, square holes extending to X-direction or Y-direction are formed.

Figure 9:
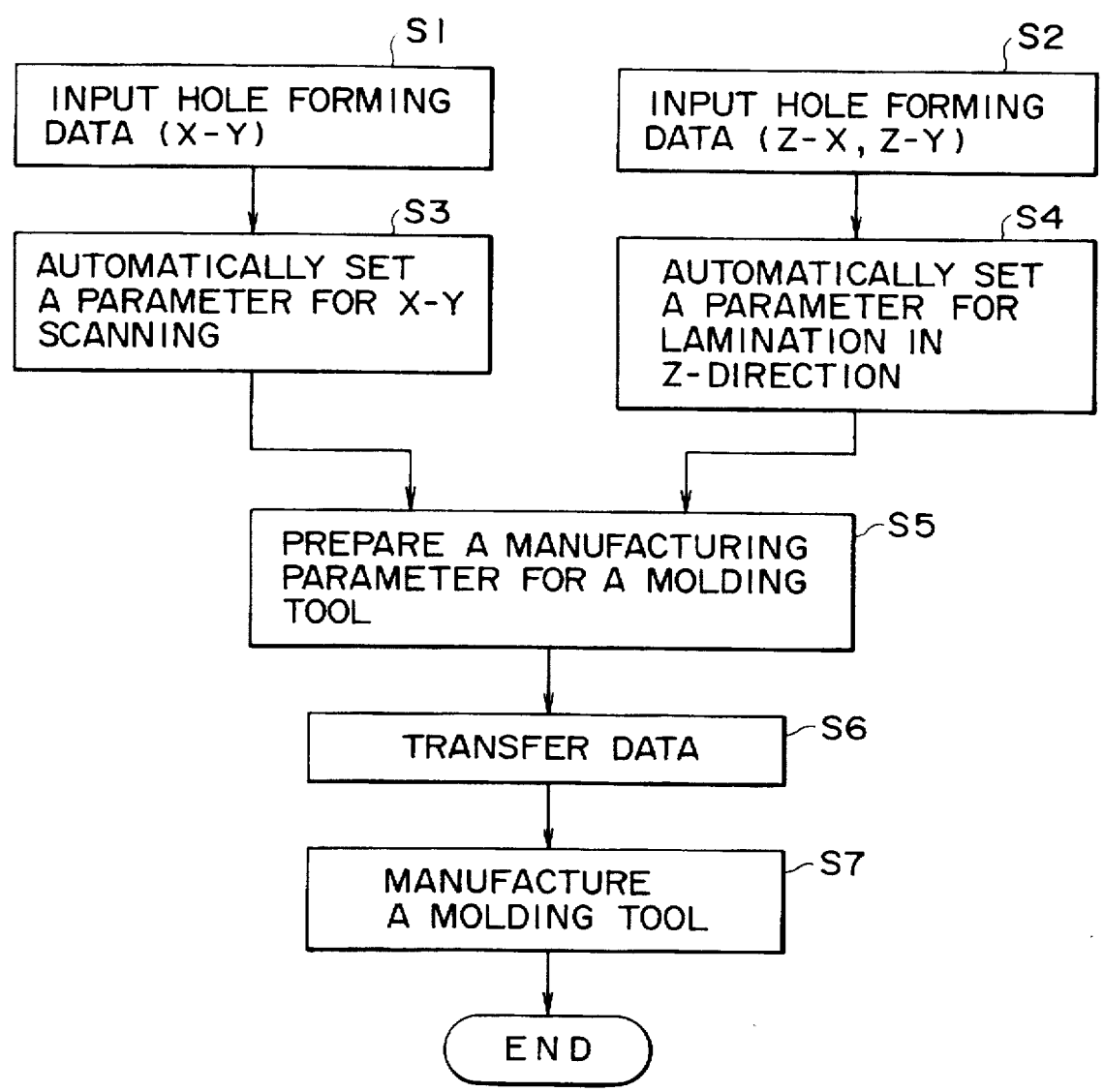
FIG. 9 is a flow chart for describing the flow of forming a molding tool in accordance with the present invention.

FIG. 9 is a flow chart for illustrating the flow of preparation of a molding tool including the above mentioned procedures (a3).

In the step S1, as described in FIGS. 7A and 7B, data necessary for hole forming in a plane parallel to X-Y plane is supplied, and in the step S2, as described in FIG. 8, data necessary for hole forming in a plane parallel to Z-X plane and Z-Y plane is supplied.

In the step S3 subsequent to the step S1, a parameter for light scanning in X-Y plane is set automatically from the input data in the step S1. The parameter serves as basic information for laser scanning by the light scanner 4.

In the step S4 subsequent to the step S2, a parameter necessary for controlling in the laminating direction is set automatically from the input data in the step S2. The parameter serves as basic information for controlling of the stage 14 by the moving mechanism 5.

The parameters obtained in the steps S3 and S4 are incorporated in the manufacturing parameter as a part thereof in the step S5. The manufacturing parameter includes all the information necessary for manufacturing of a molding tool 21, and the manufacturing parameter information can be stored in the computer 2 as a data base, that is, data can be accumulated. In detail, not only existing data is selected by selecting desired data from various stored data but also the stored data is used as the basic data for compiling of stored data and for optimal designing of a molding tool utilizing CAE (abbreviation of computer aided engineering).

Controlling information corresponding to the manufacturing parameters is data-transferred to the controller 3 in the step S6, and the light scanner 4 and moving mechanism 5 are controlled in compliance with a command from the controller 3.

Then, in the step S7, cross-sectional layer are formed corresponding to every down-moving step of the stage 14 driven by the moving mechanism 5, many thin cross-sectional layers are laminated, then a molding tool grows as the lamination proceeds.

After lifting up of the stage 11 from the photo-setting resin tank 7, prescribed treatment (for example, ultraviolet setting) is applied to the molding tool and thus the molding tool 21 is completed.

As described herein above, according to the lamination molding, many suction holes 21a, 21a, . . . formed on a molding tool 21 are formed as material lacks, thus a molding tool 21 having a porous structure is manufactured.

In the above mentioned embodiment, a method in which bristle-like resin layers are laminated by laser beam scanning, however, in the case of planer irradiation method as shown in FIG. 3, a picture information corresponding to a lattice pattern as shown in FIGS. 7A and 7B is supplied to the CRT 17, and the lattice pattern is displayed on the irradiation plane.

In the above mentioned embodiment, the basic shape 19 of the molding tool is accommodated in an orthogonal coordinate system and holes are formed in directions along each axis, however otherwise, a basic shape of a molding tool may be accommodated in an oblique coordinate system to form holes directed in oblique directions or the center of holes may be moved along a prescribed curve to form holes in different directions optionally. The shape of holes is not limited to the above mentioned square shape and any shape (for example, circular hole, hexagonal hole, etc.) may be selected as long as it does not causes a problem in the manufacturing.

In the above mentioned embodiment, the equipment is structured so that a manufacturing parameter is prepared in the equipment 1 and it is transferred to the controller 3, however, in the case that a manufacturing parameter can be prepared in an external computer, the process is omitted, and data of the manufacturing parameter can be used as it is. In detail, in this case, the processing by the computer 2 has been carried out previously using another calculating means, the data of manufacturing parameter is transferred to the photo-molding equipment 1 via offline or online and the data is used as a control information for the controller 3.

For manufacturing of a molding tool, not limited to a method in which photo-setting resin is used, other methods in which laminating material reactive to electromagnetic waves such as electron beam and radiation may be used, and otherwise, above mentioned various laminating molding methods may be used, however, use of the photo-setting resin method is advantageous in that material cost is low and manufacturing time is short.

In the above mentioned embodiment, a process for manufacturing one molding tool is described, however, use of the lamination molding method is advantageous in that a plurality of molding tools or a plurality of molding tool types is manufactured simultaneously. In detail, the shape of cross-sectional layers is not limited to the shape of one member, therefore, the shape of cross-sectional layers is set for a plurality of molding tools, and a plurality of molding tools are manufactured in only one laminating process, thus the production efficiency is improved.

Figure 10:
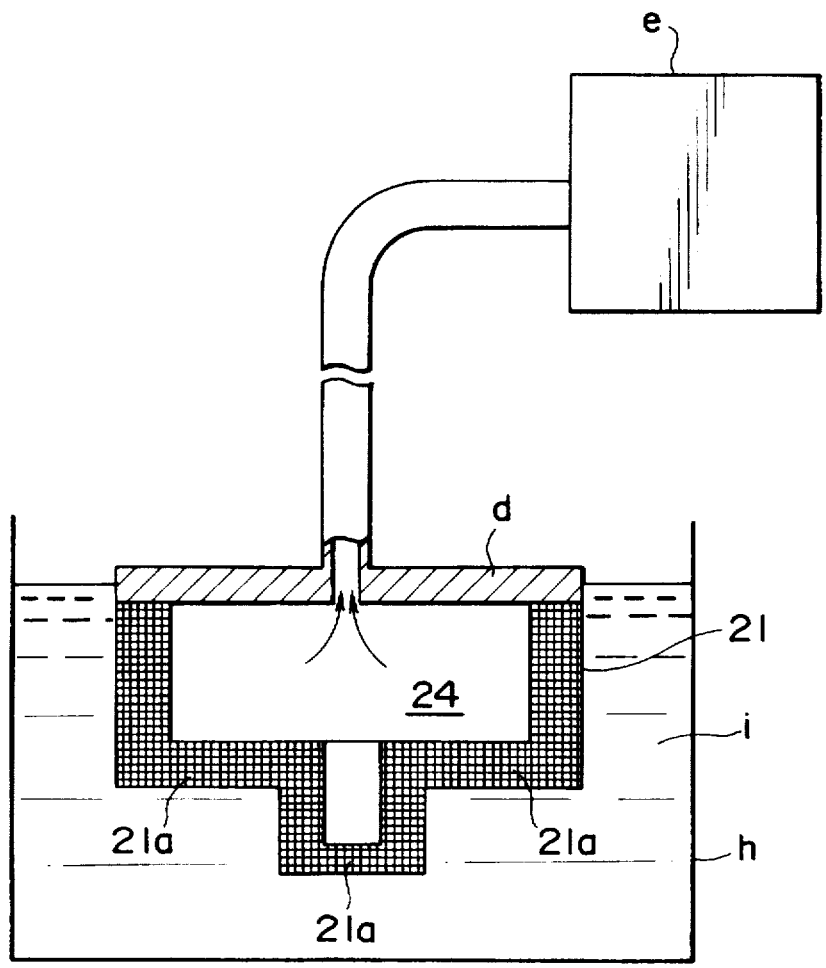
FIG. 10 is a schematic diagram for illustrating pulp molding method using a molding tool in accordance with the present invention.

FIG. 10 is a diagram for illustrating the molding tool forming using a molding tool for pulp molding formed by the lamination molding method.

As obvious from the above mentioned description, many section holes 21a, 21a, . . . are formed on a molding tool 21 by the lamination molding method, these suction holes serves as an alternative for both conventional meshes g, g, . . . and suction holes f, f, . . . .

In detail, as shown in the figure, the molding tool 21 with block-like shape is reversed and dipped in a solution "i" containing pulp fibers, an upward-opened opening of the molding tool 21 is closed with a cover "d", and the internal of the recess 24 is brought to a reduced pressure using a vacuum aspirator "e", then, the pulp fiber solution "i" in the liquid tank "h" penetrates to suction holes 21a, 21a, . . . of the molding tool 21 and pulp fibers are deposited on the surface of the molding tool 21, and the deposit grows on the surface of the molding tool 21. The preliminary molded product is shaped using a female molding tool which corresponds to the product, processed through prescribed process such as drying, and taken out from the molding tool 21, thus a molded pulp product having a shape which corresponds to the shape of the molding tool 21 is manufactured.

As described herein above, a molding tool with a porous structure and having many suction holes 21a, 21a, . . . is manufactured using the lamination molding method, thus conventional use of split molding tool and meshes is made needless.

In detail, small holes which are equivalent to openings of a mesh and suction holes of a molding tool are formed on a molding tool simultaneously when the molding tool is formed, even in the case of a molding tool with a complex shape, use of a split molding tool is needless, thus troublesome and skill-demanding works for fixing meshes on the surface of a molding tool and for fitting meshes when a design of the molding tool is changed are eliminated, and the manufacturing time of molding tools is shortened and the cost is reduced. For example, the time for manufacturing a molding tool used for manufacturing a packaging of electric appliances is compared. The conventional method requires several weeks, on the other hand, the method accordance with the present invention requires ten and several hours, thus it is obvious that the manufacturing time is significantly shortened.

Figure 11:
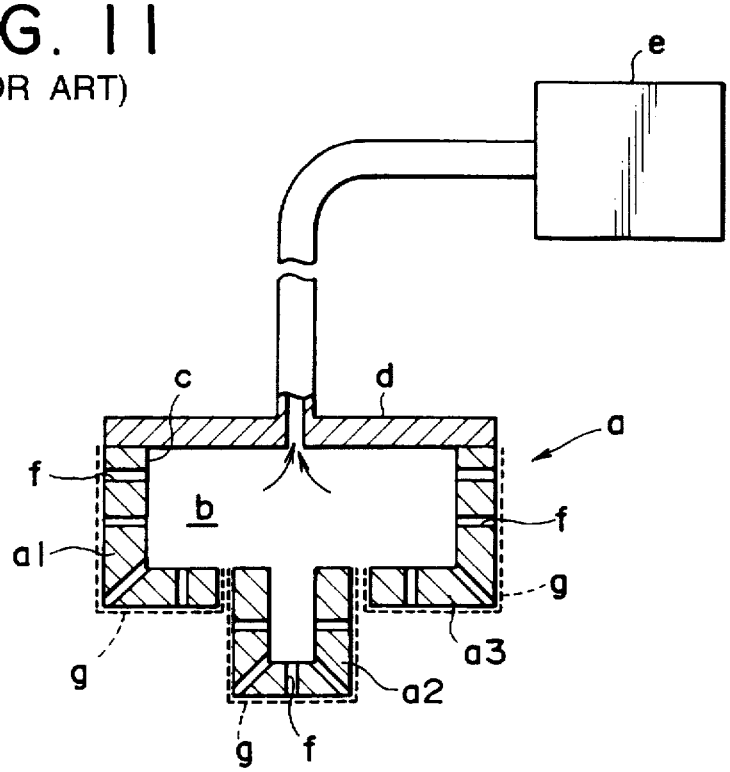
FIG. 11 is a diagram for illustrating a molding method using a conventional paper making type molding tool and for illustrating a structure of a paper making type molding tool in cooperation with FIG. 12.
Figure 12:
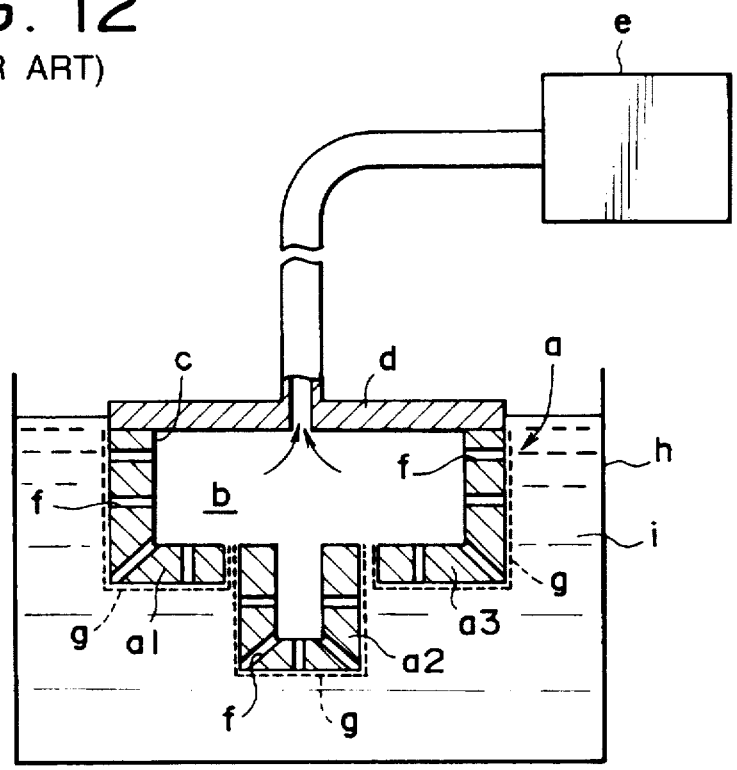
FIG. 12 is a diagram for illustrating pulp molding method using a paper making type molding tool shown in FIG. 11.

In the case that a conventional paper making type molding tool is used, larger suction holes f, f, . . . collects more fibers than smaller suction holes 21a, 21a, . . . (refer to FIG. 11), naturally, in some cases, the growth of fiber layer at areas near suction holes f and far from suction holes f is different unless suction holes f, f, . . . are positioned properly, and it is difficult to obtain uniform growth, however, the use of the above mentioned molding tool 21 allows pulp fibers to grow uniformly on the surface of the molding tool because of the uniform distribution of many small suction holes 21a, 21a, . . . , and the distribution of suction holes 21a, 21a, . . . and hole diameter are designed optionally depending on the shape of a molding tool and suction pressure.

The use of the lamination molding method for forming a molding tool enables quick and flexible response to design change of the molding tool and additional production.

As obvious from the above mentioned description, according to the invention specified by the claim 1 and claim 2, many suction holes are formed on a molding tool by lamination molding method, these suction holes serves as an alternative for suction holes formed on a conventional paper making type molding tool and meshes used in conventional method, thus, in the case that a molding tool should be formed in a complex shape, it is not necessary to use a split molding tool and meshes and to fix meshes on a molding tool unlike a conventional paper making type molding tool, skill-demanding works are not required for workers, therefore molding tools are manufactured efficiently in a short time.

What is claimed is:

1. A molding tool for molding products from fibrous material by submerging the tool in a solution containing fibers and connecting the tool to a cover that is in communication with a vacuum, the molding tool comprising:

an open upper end for connection to the cover and a lower shaped porous structure for submerging in the solution containing fibers, the lower shaped porous structure being three dimensional and comprising a lattice structure, the lattice structure comprising a plurality of layers, each layer comprising a plurality of lattice skeleton structures and a plurality of holes, the holes being disposed between the lattice skeleton structures, each lattice skeleton structure being individually fabricated by scanning a light source through a liquid photo-setting resin along a predetermined path for each lattice skeleton structure at least once for each skeleton structure to produce hardened said skeleton structures along the predetermined paths.

2. The molding tool of claim 1 wherein the light source is a laser.

3. The molding tool of claim 1 wherein the light source is an electron beam that is converted to optical energy by passing the electron beam through a fluorescent layer.

4. The molding tool of claim 1 wherein the scanning of light source along the predetermined paths is controlled with a computer and the predetermined paths are stored in a database.

5. The molding tool of claim 1 wherein each skeleton structure has a first width and the light source has a second width, the second width being less than the first width so that the light source must be scanned over the direction of each structure a plurality of times in order to solidify a sufficient amount of resin to produce a skeleton structure of the first width.

6. The molding tool of claim 1 wherein fibers have a length and each hole has width that is less than the length of the fibers.

7. A molding tool for molding products from fibrous material by submerging the tool in a solution containing fibers and connecting the tool to a cover that is in communication with a vacuum, the molding tool comprising:

an open upper end for connection to the cover and a lower shaped porous structure for submerging in the solution containing fibers, the lower shaped porous structure being three dimensional, the lower shaped porous structure comprising a lattice structure comprising a plurality of layers, each layer comprising a plurality of lattice skeleton structures and a plurality of holes, the holes being parallel to an X-Y plane, a Z-X plane and a Z-Y plane, the holes being disposed between the lattice skeleton structures, at least some of the lattice skeleton structures extending perpendicular to one another in the X-Y plane so that one pair of parallel skeleton structures extending perpendicular to another pair of parallel skeleton structures forms a hole parallel to the X-Y plane, at least some of the lattice skeleton structures extending perpendicular to one another in the Z-X plane so that one pair of parallel skeleton structures extending perpendicular to another pair of parallel skeleton structures forms a hole parallel to the Z-X plane, at least some of the lattice skeleton structures extending perpendicular to one another in the Z-Y plane so that one pair of parallel skeleton structures extending perpendicular to another pair of parallel skeleton structures forms a hole parallel to the Z-Y plane, each skeleton structure disposed in the X-Y plane being individually fabricated by scanning a light source through a liquid photo=setting resin along the X-Y plane in the X direction at least once for each skeleton structure extending in the X direction and in the Y direction at least once for each skeleton structure extending in the Y direction to produce hardened skeleton structures in the X-Y plane, each skeleton structure disposed in the Z-X plane being individually fabricated by scanning the light source through the liquid photo-setting resin along the Z-X plane in the Z direction at least once for each skeleton structure extending in the Z direction and in the X direction at least once for each skeleton structure extending in the X direction to produce hardened skeleton structures in the Z-X plane, each skeleton structure disposed in the Z-Y plane being individually fabricated by scanning the light source through the liquid photo-setting resin along the Z-Y plane in the Z direction at least once for each skeleton structure extending in the Z direction and in the Y direction at least once for each skeleton structure extending in the Y direction to produce hardened skeleton structures in the Z-Y plane.

8. The molding tool of claim 7 wherein the light source is a laser.

9. The molding tool of claim 7 wherein the light source is an electron beam that is converted to optical energy by passing the electron beam through a fluorescent layer.

10. The molding tool of claim 7 wherein the scanning of light source through the X-Y, Z-X and Z-Y planes is controlled with a computer.

11. The molding tool of claim 7 wherein the skeleton structures in the X-Y, Z-X and Z-Y planes are formed in a plurality of layers.

12. The molding tool of claim 7 wherein each skeleton structure has a first width and the light source has a second width, the second width being less than the first width so that the light source must be scanned over the direction of each structure a plurality of times in order to solidify a sufficient amount of resin to produce a skeleton structure of the first width.

13. A molding tool for molding products from fibrous material, the tool comprising:

a three dimensional shaped porous structure comprising a lattice structure comprising a plurality of layers, each layer comprising a plurality of lattice skeleton structures and a plurality of holes, the holes being parallel to an X-Y plane, a Z-X plane and a Z-Y plane, the lattice skeleton structures being fabricated from a hardened photo-setting resin, at least some of the lattice skeleton structures extending perpendicular to one another in the X-Y plane so that one pair of parallel skeleton structures extending perpendicular to another pair of parallel skeleton structures forms a hole parallel to the X-Y plane, at least some of the lattice skeleton structures extending perpendicular to one another in the Z-X plane so that one pair of parallel skeleton structures extending perpendicular to another pair of parallel skeleton structures forms a hole parallel to the Z-X plane, at least some of the lattice skeleton structures extending perpendicular to one another in the Z-Y plane so that one pair of parallel skeleton structures extending perpendicular to another pair of parallel skeleton structures forms a hole parallel to the Z-Y plane.

14. A molding tool for molding products from fibrous material by submerging the tool in a solution containing fibers and connecting the tool to a cover that is in communication with a vacuum, the molding tool comprising:

an open upper end for connection to the cover and a lower shaped porous structure for submerging in the solution containing fibers, the lower shaped porous structure being comprised of a three dimensional multiple layer lattice structure, the lattice structure comprising a plurality of layers, each layer comprising a plurality of lattice skeleton structures made from a hardened photo-setting resin material and a plurality of holes, the holes being parallel to an X-Y plane, a Z-X plane and a Z-Y plane, at least some of the lattice skeleton structures extending perpendicular to one another in the X-Y plane so that one pair of parallel skeleton structures extending perpendicular to another pair of parallel skeleton structures forms a hole parallel to the X-Y plane, at least some of the lattice skeleton structures extending perpendicular to one another in the Z-X plane so that one pair of parallel skeleton structures extending perpendicular to another pair of parallel skeleton structures forms a hole parallel to the Z-X plane, at least some of the lattice skeleton structures extending perpendicular to one another in the Z-Y plane so that one pair of parallel skeleton structures extending perpendicular to another pair of parallel skeleton structures forms a hole parallel to the Z-Y plane, each skeleton structure disposed in the X-Y plane being individually fabricated by scanning a light source through a liquid photo-setting resin along the X-Y plane in the X direction at least once for each skeleton structure extending in the X direction and in the Y direction at least once for each skeleton structure extending in the Y direction to produce hardened skeleton structures in the X-Y plane.

each skeleton structure disposed in the Z-X plane being individually fabricated by scanning the light source through the liquid photo-setting resin along the Z-X plane in the Z direction at least once for each skeleton structure extending in the Z direction and in the X direction at least once for each skeleton structure extending in the X direction to produce hardened skeleton structures in the Z-X plane.

each skeleton structure disposed in the Z-Y plane being individually fabricated by scanning the light source through the liquid photo-setting resin along the Z-Y plane in the Z direction at least once for each skeleton structure extending in the Z direction and in the Y direction at least once for each skeleton structure extending in the Y direction to produce hardened skeleton structures in the Z-Y plane.

* * * * *